May 13, 1924.
W. A. DAKE
BREAD PAN
Filed March 8, 1921
1,493,478
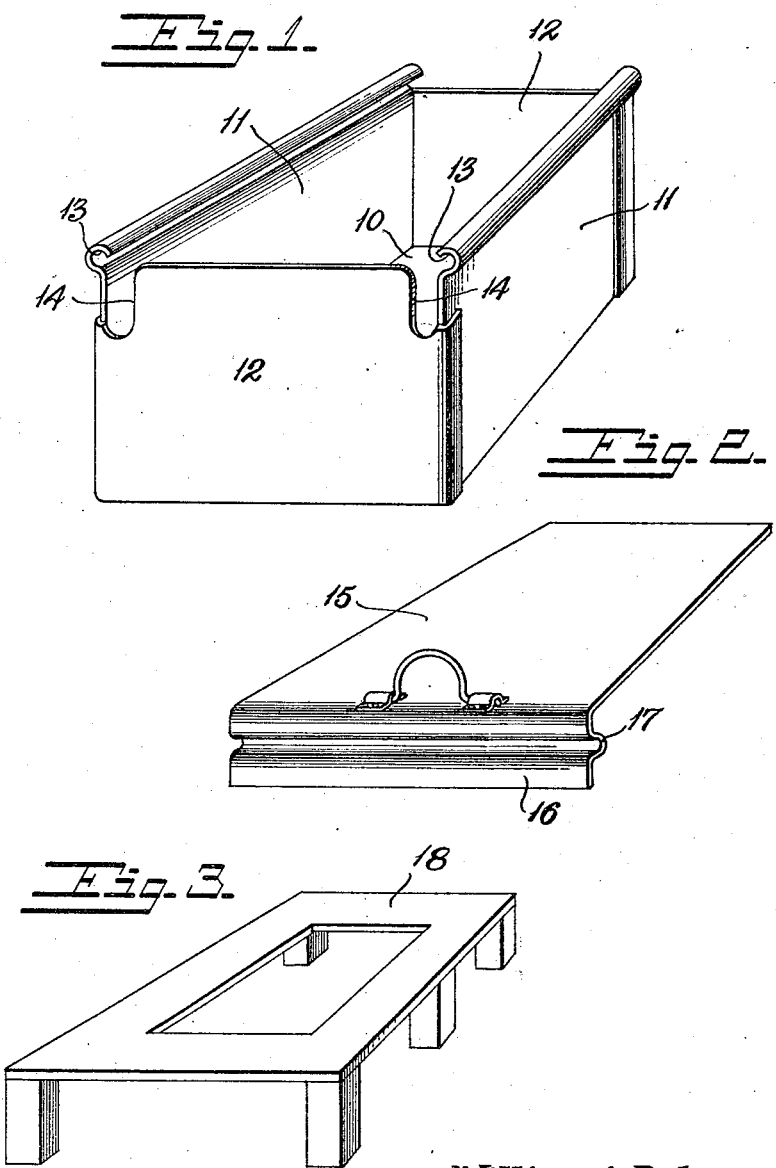
William A. Dake, INVENTOR.
BY
J. Reaney Kelly, ATTORNEY.

Patented May 13, 1924.

1,493,478

UNITED STATES PATENT OFFICE.

WILLIAM A. DAKE, OF NEW CASTLE, ALABAMA.

BREAD PAN.

Application filed March 8, 1921. Serial No. 450,758.

*To all whom it may concern:*

Be it known that I, WILLIAM A. DAKE, citizen of the United States, residing at New Castle, in the county of Jefferson and State of Alabama, have invented certain new and useful Improvements in Bread Pans, of which the following is a specification.

This invention relates to improvements in cooking utensils and more particularly to a new and improved pan for baking bread.

The main object of the invention is to provide an improved baking pan for bread which includes a cover which serves to retain the steam and vapor arising from the bread during the baking operation and which also insures a more thorough and efficient baking operation, together with means to allow the escape of the steam and the vapors from the interior of the pan arranged in an advantageous position and which prevents an accumulation of pressure within the pan during the baking operation.

A further object of the invention is to provide an improved baking pan for bread which may also be used simply as a cooking pan and in which case the bread to be baked is superimposed above the bottom of the pan to prevent burning and to allow the placing of a small quantity of water in the pan so as to slightly moisten the bread, such as by steaming.

A still further object of the invention is to provide an improved utensil of the above character which is simple in construction, strong and durable and which it is believed may be manufactured at a reasonably low cost.

Various other objects and advantages of my invention will become apparent during the continuance of the following description.

In the drawing:

Figure 1 is a view in perspective showing my invention as in its preferred embodiment, the lid or cover portion of the pan proper being removed.

Figure 2 is a view in perspective of the improved top of the pan.

Figure 3 is a view in side elevation of a rack or supplemental bottom used in the pan when the latter is used in the capacity of a bread warming device.

In reducing my invention to practice I first provide the pan or body portion of the device which consists of a bottom 10, sides 11 and end portions 12. The upper longitudinal portions of the side portions 11 are curved throughout their length to form parallel guideways or terminals 13 in which the longitudinal edges of the top of cover portion operate, as will be hereinafter fully described. The end portions 12 of the device terminate slightly below the plane of the guide ways or channel 13 and one of the end portions is cut away just below the guide ways or channel portions 13 to form openings 14. The purpose of these openings will presently appear.

The top of cover portion 15 is of substantially the same width and length as the pan portion of the device, its longitudinal edges being adapted to operate in the guide way or channel 13 of the side members 11. At one end the cover portion 15 is provided with a depending flange 16 which extends the entire width, and the inner face of the flange is provided with a longitudinal rib 17. The purpose of this construction is to space the flange 16 from the end portion 12 containing the opening 14 so as to permit egress of air to and from the pan portion of the device so as to prevent the accumulation of pressure in the pan portion and yet, at the same time to prevent the free escape of the steam and vapors from the pan.

When the cover portion 15 is in place the majority of the steam and vapors arising from the bread being baked are kept within the pan and absorbed to some extent by the bread. When the steam and vapors accumulate, however, egress is had through the opening 14 and along the inner face of the flange 16 so as to prevent the accumulation of pressure within the pan and in general to insure the efficient operation of the cooking utensil.

When the device is used for warming bread, etc., the rack 18 shown in detail in Figure 3, is used, the same being placed within the pan so that the legs thereof rest upon the bottom of the pan. A small quantity of water may be poured into the pan which, when heated will give off a steam so that the bread being warmed will be slightly moistened.

From the foregoing it is believed that the advantages and novel features of my invention will be readily understood and therefore further detailed description is deemed unnecessary.

What is claimed is:

1. In a device of the character described, a pan portion including a bottom, sides and ends, said sides being extended and having their upper longitudinal edges bent to form longitudinal guide-ways, one of said end portions provided with openings opened to the upper edge thereof, a cover member having its longitudinal edges positioned in said guide-ways, a flange depending from one end of said cover, a longitudinal rib positioned on the inner face of said flange to space said flange from the adjacent end portion whereby steam and vapors accumulating in said pan portion escape through said openings for the purpose set forth and described.

2. A cooking vessel comprising a pan having openings adjacent its upper edge and at one end, and a cover for the pan having a depending flange adapted to extend transversely of said openings, and abutment means provided on the flange for engaging the pan to space the flange from the said openings when the cover is in closed position whereby an air or vapor passageway is provided transversely of the pan and in alignment with the openings thereof.

3. A cooking vessel comprising a pan having pressure-escape vents at one end and a cover for the pan, said cover having a flanged portion depending in front of the opening and ribbed transversely on the inner face to abut the end of the pan below the openings whereby a vent passage is formed transversely of the end of the pan and in line with the escape-openings.

In testimony whereof I affix my signature.

WILLIAM A. DAKE.